United States Patent
Lin et al.

(10) Patent No.: US 12,480,301 B2
(45) Date of Patent: Nov. 25, 2025

(54) AUTOMATIC SEWAGE REGULATION SYSTEM AND REGULATING METHOD THEREOF

(71) Applicant: FENRI CO., LTD., New Taipei (TW)

(72) Inventors: Shueh-Ting Lin, New Taipei (TW); Shang-Jung Wu, New Taipei (TW); Ya-Chen Cheng, New Taipei (TW); Yung-Yun Cheng, New Taipei (TW)

(73) Assignee: FENRI CO., LTD., New Taipei (TW)

( * ) Notice: Subject to any disclaimer, the term of this patent is extended or adjusted under 35 U.S.C. 154(b) by 524 days.

(21) Appl. No.: 18/089,853

(22) Filed: Dec. 28, 2022

(65) Prior Publication Data

US 2023/0160194 A1    May 25, 2023

Related U.S. Application Data

(63) Continuation-in-part of application No. 17/172,739, filed on Feb. 10, 2021, now abandoned, which is a continuation of application No. 16/423,835, filed on May 28, 2019, now abandoned.

(51) Int. Cl.
*E03F 5/10*    (2006.01)
*C02F 1/00*    (2023.01)

(52) U.S. Cl.
CPC ............ *E03F 5/105* (2013.01); *C02F 1/004* (2013.01); *C02F 1/006* (2013.01); *C02F 2209/001* (2013.01); *C02F 2209/02* (2013.01); *C02F 2209/04* (2013.01); *C02F 2209/05* (2013.01); *C02F 2209/06* (2013.01); *C02F 2209/10* (2013.01); *C02F 2209/11* (2013.01); *C02F 2209/22* (2013.01); *C02F 2209/40* (2013.01)

(58) Field of Classification Search
None
See application file for complete search history.

(56) References Cited

U.S. PATENT DOCUMENTS

| | | |
|---|---|---|
| 2006/0126426 A1 | 6/2006 | Panuccio |
| 2013/0001142 A1 | 1/2013 | Novak et al. |
| 2013/0180928 A1 | 7/2013 | Vielma |
| 2016/0200608 A1* | 7/2016 | Tharp .................. C02F 3/12 210/170.03 |
| 2017/0029295 A1 | 2/2017 | Ritchie et al. |
| 2025/0163881 A1* | 5/2025 | Day .................. F03B 17/06 |

* cited by examiner

*Primary Examiner* — Richard C Gurtowski
(74) *Attorney, Agent, or Firm* — MUNCY, GEISSLER, OLDS & LOWE, P.C.

(57) ABSTRACT

An automatic sewage regulation system and a regulating method are provided. The automatic sewage regulation system is disposed between preset sewage sources and a preset sewage treatment apparatus and includes an equalization tank and an automatic sewage regulating device. The automatic sewage regulating device includes sensing modules for sensing and transmitting water quality sensing values of sewage in the preset sewage sources to a control module which outputs regulating signals to water flow regulators, so that the water flow regulators can regulate flowing volumes of the sewage of the preset sewage sources according to the regulating signal, to keep a water quality sensing value of the sewage in the equalization tank within a preset range, thereby preventing the equalization tank from converging sewage having excessively-high or excessively-low water quality sensing value. As a result, burden of a preset sewage treatment apparatus can be reduced.

8 Claims, 3 Drawing Sheets

A

Automatic sewage regulating device can use the plurality of sensing modules to sense the water quality sensing values of the sewage in the plurality of preset sewage sources, and transmit the plurality of sensed water quality sensing values to the control module of the automatic sewage regulating device.

A01

The control module of the automatic sewage regulating device can compare a sum of the water quality sensing values sensed by the sensing modules with a preset water quality sensing threshold of an equalization tank, and when the sum of the water quality sensing values sensed by some or all of the plurality of sensing modules exceeds the preset water quality sensing threshold of the equalization tank, and the step (B) is executed; when the sum of the water quality sensing values sensed by some or all of the plurality of sensing modules is lower than the preset water quality sensing threshold of the equalization tank, the step (A02) is executed.

B

The control module outputs the regulating signals to the plurality of water flow regulators of the automatic sewage regulating device according to the plurality of water quality sensing values, so that the plurality of water flow regulators can regulate the volume of the sewage flowing from some or all of the plurality of preset sewage sources to the equalization tank according to the received regulating signal, thereby keeping the water quality sensing value of the sewage converging into the equalization tank from some or all of the plurality of preset sewage sources within the preset range.

A02

The sewage in some or all of the plurality of preset sewage sources is directly converged into the equalization tank, and the regulating method executes the step (C).

C

The sewage in the equalization tank flows through the preset sewage treatment apparatus which performs the purification process to make the sewage flowing therethrough to meet the sewage discharge standard.

*FIG.3*

AUTOMATIC SEWAGE REGULATION SYSTEM AND REGULATING METHOD THEREOF

CROSS REFERENCE TO THE RELATED APPLICATIONS

This application is a Continuation-In-Part of application Ser. No. 17/172,739, filed on Feb. 10, 2021; which is a Continuation of application Ser. No. 16/423,835, filed on May 28, 2019; for which priority is claimed under 35 U.S.C. § 120, the entire contents of all of which are hereby incorporated by reference.

BACKGROUND OF THE INVENTION

1. Field of the Invention

The present invention provides an automatic sewage regulation system and a regulating method thereof, more particularly to an automatic sewage regulation system which uses an automatic sewage regulating device to regulate sewage outflow volumes of a plurality of preset sewage sources, to keep a water quality sensing value of sewage in an equalization tank within a preset range, so as to reduce a burden of a preset sewage treatment apparatus for sequential treatment, thereby extending lifetime of the preset sewage treatment apparatus.

2. Description of the Related Art

With the rapid development of science technology and industry, environmental pollution is becoming more and more serious. Among the environmental problems, the problem of water pollution is the most serious, so plating industry, food processing industry, dyeing industry, traditional industry, semiconductor industry or high-tech industry need sewage treatment plants to treat the discharged sewage. During sewage treatment process, the sewage treatment plant first separates inflow pipelines according to the industry, and measures the inflow water quality status and water volumes of the inflow pipelines, and then converges the multiple sewage sources. Next, a purification process, such as sedimentation, mixing, aeration or filtration, is performed on the converged sewage. The water quality of the purified sewage must be detected, and when the water quality of the purified sewage can meet a sewage discharge standard, the purified sewage can be discharged to an external water area.

However, it is hard to predict the volumes and pollution degrees of sewage discharged by various industries, so when a highly-polluting factory suddenly discharges a large volume of highly-polluted sewage to the sewage treatment plant, the sudden inflow of high-polluting sewage possibly damages the purification apparatus in the sewage treatment plant. Furthermore, in order to cope with the sudden highly-polluted sewage, more manpower is required to add extra dosages in the purification apparatus, and it increases extra manpower and dosage cost. Furthermore, most highly-polluting factories discharge sewage during the daytime and not evening period, so these purification apparatuses can only purify and treat low-polluting sewage during the evening period, and it results in a low facility utilization rate of the purification apparatus. When the purification apparatus cannot be effectively utilized, many resources of the sewage treatment plant are wasted.

Therefore, what is needed is to develop an automatic sewage regulation system to solve above-mentioned problems.

SUMMARY OF THE INVENTION

In order to solve above-mentioned problems, inventors develop an automatic sewage regulation system and a regulating method thereof according to collected data, multiple tests and modification, and years of research experience.

An objective of the present invention is that an automatic sewage regulating device can use a plurality of sensing modules to sense water quality sensing values of sewage in plurality of preset sewage sources, and transmit the sensed water quality sensing values to a control module of the automatic sewage regulating device, and the control module can output regulating signals to a plurality of water flow regulators of the automatic sewage regulating device according to the water quality sensing values, so that the plurality of water flow regulators can regulate volumes of sewage flowing from the plurality of preset sewage sources to the equalization tank according to the received regulating signals, so as to keep a water quality sensing value of sewage converging into the equalization tank from the plurality of preset sewage sources within a preset range. The preset sewage treatment apparatus can purify the sewage in the equalization tank to meet a sewage discharge standard. As a result, since the automatic sewage regulating devices are used to stably keep the water quality sensing value of the sewage in the equalization tank within the preset range, it prevents the equalization tank from converging sewage having excessively-high or excessively-low water quality sensing value, so as to reduce the burden of the preset sewage treatment apparatus for sewage treatment and extend the lifetime of the preset sewage treatment apparatus. Furthermore, the water quality sensing value of the sewage in the equalization tank can be kept within the preset range stably, so that the dosage for the purification process of the preset sewage treatment apparatus can be kept in a stable amount, thereby achieving the purpose of reducing sewage treatment cost.

Another objective of the present invention is that each of the plurality of preset sewage sources can use the automatic sewage regulating device to automatically regulate the water outflow volume thereof, to extend a time period in which the sewage having the high water quality sensing value flows into the equalization tank, so as to extend a facility utilization time of the preset sewage treatment apparatus and increase a facility utilization rate of the preset sewage treatment apparatus, thereby achieving the purpose of efficient operation and reduced cost.

Another objective of the present invention is that each of the plurality of preset sewage sources can use the automatic sewage regulating device to automatically regulate the outflow volume thereof, to keep the water quality sensing value of the sewage in the equalization tank within the preset range stably, so that the dosage for the purification process of the preset sewage treatment apparatus can be kept in a stable amount to save manpower for treatment, thereby achieving purpose of improving purification effect, reducing operational cost and improving operational convenience.

BRIEF DESCRIPTION OF THE DRAWINGS

The structure, operating principle and effects of the present invention will be described in detail by way of various embodiments which are illustrated in the accompanying drawings.

FIG. 3 is a flowchart of a regulating method of the present invention.

DETAILED DESCRIPTION OF THE PREFERRED EMBODIMENTS

Figure 1:
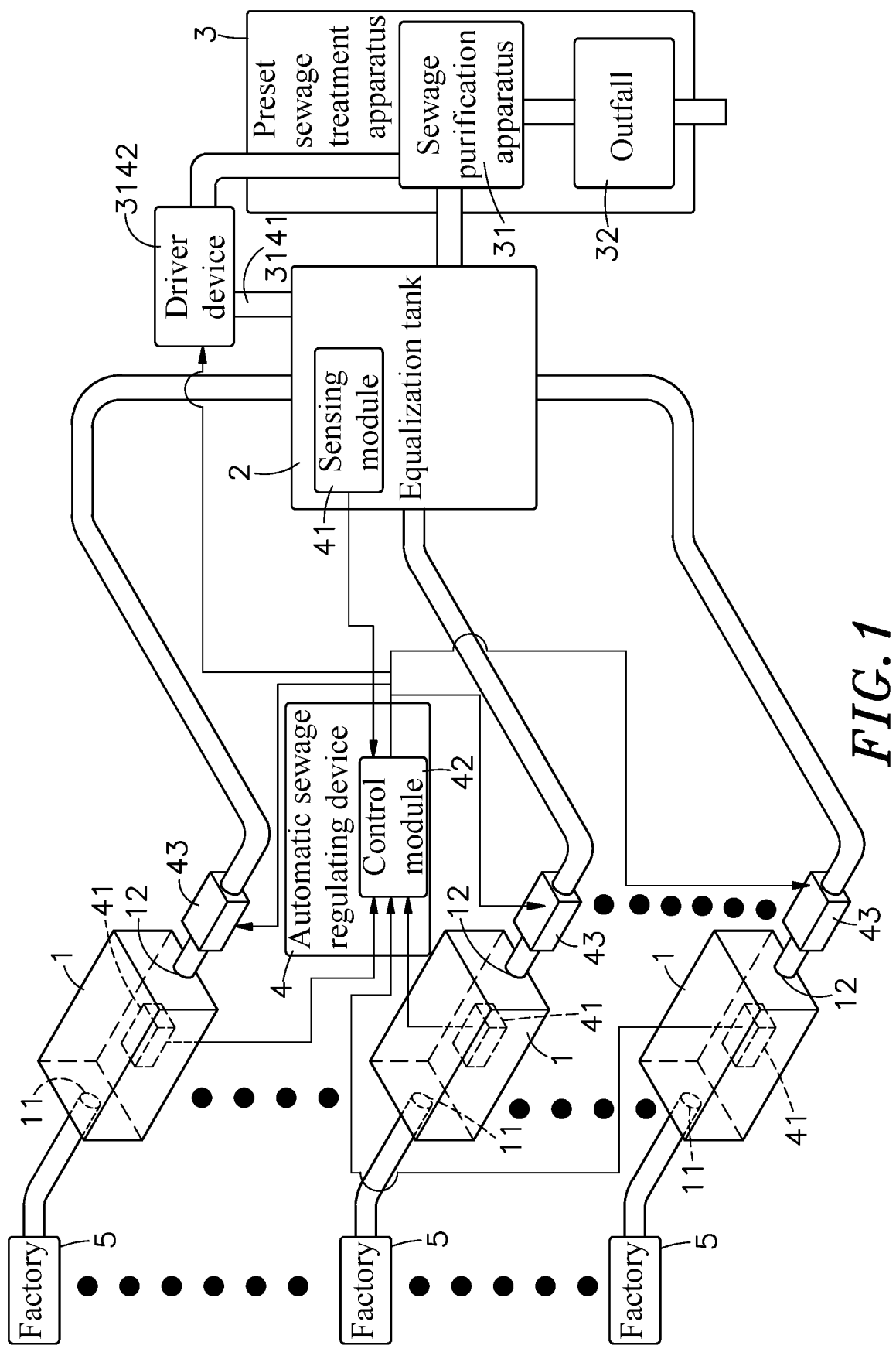
FIG. 1 is a block diagram of an automatic sewage regulation system of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 2:
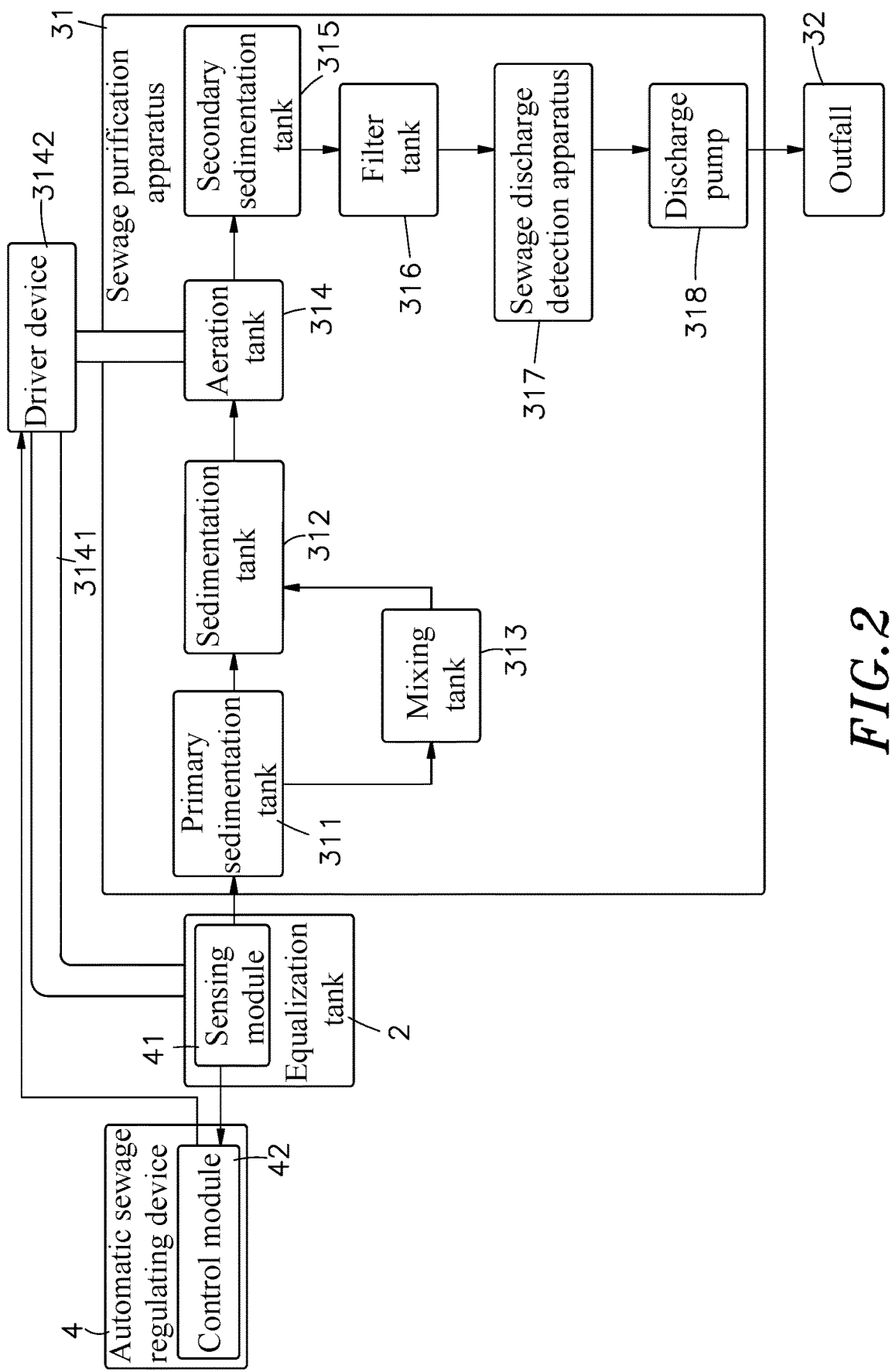
FIG. 2 is a block diagram of a preset sewage treatment apparatus of the present invention.

Please refer to FIGS. 1 and 2, which show a block diagram of an automatic sewage regulation system of the present invention and a block diagram of a preset sewage treatment apparatus of the present invention. As shown in FIG. 1, the automatic sewage regulation system is disposed between a plurality of preset sewage sources 1 and a preset sewage treatment apparatus 3, and the automatic sewage regulation system can include an equalization tank 2 and an automatic sewage regulating device 4.

Each of plurality of preset sewage sources 1 can be a buffer tank configured to receive sewage discharged from a factory 5 or rain water, and each buffer tank includes a water inlet 11 and a water outlet 12, and the water inlet 11 is in communication to the factory 5.

The equalization tank 2 is connected to the water outlets 12 of the plurality of preset sewage sources 1 and configured to converge the sewage discharged from the plurality of preset sewage sources 1 and discharge the sewage to the preset sewage treatment apparatus 3 for sewage purification treatment.

The preset sewage treatment apparatus 3 is connected to the equalization tank 2, and can include a sewage purification apparatus 31 for purifying the sewage discharged from the equalization tank 2 to meet a sewage discharge standard, and an outfall 32 formed on the sewage purification apparatus 31 and configured to discharge the purified sewage to a preset water area, such as reservoir, river, lake, water bath, ditch or sea. The sewage purification apparatus 31 can include a primary sedimentation tank 311, a sedimentation tank 312 in communication with the primary sedimentation tank 311, a mixing tank 313 in communication with the sedimentation tank 312 and the primary sedimentation tank 311, an aeration tank 314 in communication with the sedimentation tank 312, a secondary sedimentation tank 315 in communication with the aeration tank 314, a filter tank 316 in communication with the secondary sedimentation tank 315, and a sewage discharge detection apparatus 317 disposed on the filter tank 316 and configured to detect whether the water quality meets the sewage discharge standard, and a discharge pump 318 disposed on the sewage discharge detection apparatus 317 and configured to draw the purified sewage to the outfall 32.

The automatic sewage regulating device 4 includes a plurality of sensing modules 41 respectively disposed in the plurality of preset swage sources 1 and configured to sense water quality sensing values, such as turbidity values, suspended-solid values, dissolved oxygen values, temperatures, conductivity values, pH values, oxidation reduction potential values, total dissolved-solid values, biochemical oxygen demand (BOD) values, chemical oxygen demand (COD) values, ammonia nitrogen values, heavy metal values or flow rates, etc. The sensing modules 41 are electrically connected to a control module 42 which can receive the water quality sensing values and generate water flow regulation signals according to the water quality sensing values. A plurality of water flow regulators 43 are electrically connected to the control module 42 and disposed in a preset water outlets of the preset sewage sources 1, respectively, and configured to regulate flow volumes of the sewage flowing from the plurality of preset swage sources 1 into the equalization tank 2 according to the water flow regulation signals transmitted by the control module 42.

In an embodiment, each of the plurality of sensing module 41 of the automatic sewage regulating device 4 can be a water quality sensor for sensing a water quality sensing value indicating a state of the water, for example, the water quality sensor can be a temperature sensor, a conductivity sensor, a pH value sensor, a dissolved oxygen sensor, a total dissolved-solid sensor, an oxidation reduction potential sensor, a turbidity sensor, a suspended-solid sensor, a biochemical oxygen demand sensor, a chemical oxygen demand sensor, an ammonia nitrogen sensor, a heavy metal sensor or a flow meter, etc.

Furthermore, the water flow regulator 43 of the automatic sewage regulating device 4 can be a device for controlling a volume of the water flow. For example, the water flow regulator 43 can be a pump, an electric flow regulating valve, or a frequency converter, etc.

Please refer to FIG. 3, which is a flowchart of a regulating method of the present invention. The regulating method can be executed by the automatic sewage regulation system of the present invention, and include steps (A) to (C), (A01), and (A02).

In a step (A), the automatic sewage regulating device 4 can use the plurality of sensing modules 41 to sense the water quality sensing values of the sewage in the plurality of preset sewage sources 1, and transmit the plurality of sensed water quality sensing values to the control module 42 of the automatic sewage regulating device 4.

In a step (B), the control module 42 outputs the regulating signals to the plurality of water flow regulators 43 of the automatic sewage regulating device 4 according to the plurality of water quality sensing values, so that the plurality of water flow regulators 43 can regulate the volume of the sewage flowing from some or all of the plurality of preset sewage sources 1 to the equalization tank 2 according to the received regulating signal, thereby keeping the water quality sensing value of the sewage converging into the equalization tank 2 from some or all of the plurality of preset sewage sources 1, within the preset range.

In a step (C), the sewage in the equalization tank 2 flows through the preset sewage treatment apparatus 3 which performs the purification process to make the sewage flowing therethrough to meet the sewage discharge standard. As a result, the operation of the automatic sewage regulation system of the present invention is completed.

Each of the plurality of preset sewage sources 1 can have the water inlet 11 and the water outlet 12, and the water outlets 12 of the plurality of preset sewage sources 1 are in communication with the equalization tank 2 together. The sewage discharged from factories 5 or rain water, such as factories in traditional industry, semiconductor industry, high technology industry or other industry, can flow into the water inlets 11 of the plurality of preset sewage sources 1, and the sewage can flow into the equalization tank 2 via the water outlets 12 of the plurality of preset sewage sources 1.

Furthermore, before the step (B), the regulating method of the present invention can execute steps (A01) and (A02).

In a step (A01), the control module 42 of the automatic sewage regulating device 4 accumulates the water quality sensing values sensed by the plurality of sensing modules 41 to obtain a sum, and compare the sum with a preset water quality sensing threshold of the equalization tank 2, and when the sum of the water quality sensing values sensed by some or all of the plurality of sensing modules 41 is higher than the preset water quality sensing threshold of the equalization tank 2, a step (B) is executed, and when the sum of the water quality sensing values sensed by some or all of the plurality of sensing modules 41 is lower than the preset water quality sensing threshold of the equalization tank 2, performing a step (A02) is executed.

In a step (A02), the sewage in some or all of the plurality of preset sewage sources 1 are directly converged into the equalization tank 2, and the regulating method executes the step (C).

In the step (A01), when the control module 42 of the automatic sewage regulating device 4 determines that the sum of the water quality sensing values is higher than the preset water quality sensing threshold of the equalization tank 2, at least one preset sewage source 1 having the water quality sensing value higher than the preset water quality sensing threshold is controlled to decrease the water output volume thereof by the corresponding water flow regulator 43, and at least one preset sewage source 1 having the water quality sensing value lower than the preset water quality sensing threshold is controlled to increase or keep the water output volume thereof by the corresponding water flow regulator 43, so as to keep the water quality sensing value of the sewage in the equalization tank 2 below the preset water quality sensing threshold; when the sum of the water quality sensing values is lower than the preset water quality sensing threshold of the equalization tank 2, at least one preset sewage source 1 having the water quality sensing value higher than the preset water quality sensing threshold is controlled to increase the water output volume thereof by the corresponding water flow regulator 43, and at least one preset sewage source 1 having the water quality sensing value lower than the preset water quality sensing threshold is controlled to decrease or keep the water output volume thereof by the corresponding water flow regulators 43, so as to keep the water quality sensing value of the sewage in the equalization tank 2 below the preset water quality sensing threshold.

When the sum of the water quality sensing values accumulated by the control module 42 is higher than a preset water quality sensing threshold of the equalization tank 2, all of the plurality of preset sewage sources 1 having the water quality sensing values higher than the preset water quality sensing threshold are controlled to decrease the water output volume thereof by all of the plurality of water flow regulators 43, so as to keep the water quality sensing value of the sewage in the equalization tank 2 below the preset water quality sensing threshold, and all of the plurality of preset sewage sources 1 are then controlled to increase or keep the water output volume thereof by all of the plurality of water flow regulators 43, so as to keep the water quality sensing value of the sewage in the equalization tank 2 below the preset water quality sensing threshold. When the sum of the water quality sensing values accumulated by the control module 42 is lower than the preset water quality sensing threshold of the equalization tank 2, all of the plurality of preset sewage sources 1 having the water quality sensing values lower than the preset water quality sensing threshold are controlled to increase or keep the water output volume thereof by all of the plurality of water flow regulators 43, to keep the water quality sensing value of the sewage in the equalization tank 2 below the preset water quality sensing threshold, and the preset sewage sources 1 are then controlled to decrease or keep the water output volume thereof by all of the plurality of water flow regulators 43, so as to keep the water quality sensing value of the sewage in the equalization tank 2 below the preset water quality sensing threshold. As a result, the burden of the preset sewage treatment apparatus for treating sewage can be reduced, and the lifetime of the preset sewage treatment apparatus can be extended.

In an embodiment, the automatic sewage regulating device 4 can include the sensing module 41 disposed in the equalization tank 2. In the step (A), the sensing module 41 disposed in the equalization tank 2 can transmit the water quality sensing value of the sewage in the equalization tank 2 to the control module 42 of the automatic sewage regulating device 4; as a result, the sensing module 41 in the equalization tank 2 can be used to sense the water quality sensing value of the sewage in the equalization tank 2 in real time, to indeed keep the water quality sensing value of the sewage in the equalization tank 2 converging from the plurality of preset sewage sources 1, within the preset range, thereby improving operational accuracy of regulating sewage volumes of the plurality of preset sewage sources 1.

In the step (C), the preset sewage treatment apparatus 3 can use the primary sedimentation tank 311, the sedimentation tank 312, the mixing tank 313, the aeration tank 314, the secondary sedimentation tank 315 and the filter tank 316 of the sewage purification apparatus 31 to purify the sewage, and use the sewage discharge detection apparatus 317 to monitor whether the water quality of the sewage in the filter tank 316 meets the sewage discharge standard. When the water quality of the sewage in the filter tank 316 meets the sewage discharge standard, the discharge pump 318 can draw the purified sewage to the outfall 32 for discharging.

Furthermore, the aeration tank 314 of the sewage purification apparatus 31 can comprise an aeration reflow pipeline 3141 disposed on a side thereof and in communication with the equalization tank 2, and a driver device 3142 disposed on the aeration reflow pipeline 3141 and electrically connected to the control module 42. In an embodiment, the driver device 3142 can be a pump. When the plurality of sensing modules 41 of the automatic sewage regulating device 4 sense that the sum of the plurality of water quality sensing values is higher than a preset tolerable concentration of the preset sewage treatment apparatus 3, the control module 42 enables the driver device 3142 to make aerated water of the aeration tank 314 reflow to the equalization tank 2 via the aeration reflow pipeline 3141, so as to keep the water quality sensing value of the equalization tank 2 within the preset tolerable concentration of the preset sewage treatment apparatus 3, and stably keep the water quality sensing value of the sewage the equalization tank 2 converging from the plurality of preset sewage sources 1 within the preset range, thereby facilitating the preset sewage treatment apparatus 3 to effectively perform purification operation and preventing the preset sewage treatment apparatus 3 from being damaged by impact of more-concentrated sewage.

In an embodiment, the automatic sewage regulating device 4 can include the sensing module 41 disposed in the equalization tank 2, and when the sensing module 41 senses that the water quality sensing value of the sewage in the equalization tank 2 is higher than the preset tolerable concentration of the preset sewage treatment apparatus 3, the aeration tank 314 of the preset sewage treatment apparatus 3 can reflow internal aerated water into the equalization tank 2, so as to reduce the water quality sensing value of the sewage in the equalization tank 2 to below the value of the preset tolerable concentration of the preset sewage treatment apparatus 3.

In practical usage of the automatic sewage regulation system of the present invention, the plurality of sensing modules 41 of the automatic sewage regulating device 4 can be used to sense the water quality sensing values of the sewage in the plurality of preset sewage sources 1, and the plurality of sensing modules 41 can transmit the sensed water quality sensing values to the control module 42 to perform analysis and calculation for regulation operation, and then the control module 42 can output the regulating signals to the plurality of water flow regulators 43, the plurality of water flow regulators 43 can regulate the flow volumes of the sewage flowing from the plurality of preset sewage sources 1 upon receipt of the received regulating signals, so as to keep the water quality sensing values of the sewage converging to the equalization tank 2 from the plurality of preset sewage sources 1 within the preset range, and when the sewage in the equalization tank 2 is discharged outwardly, the preset sewage treatment apparatus 3 can purify and filter the sewage to meet the sewage discharge standard. Since the plurality of preset sewage sources 1 can regulate the outflow volumes thereof by the automatic sewage regulating device 4, the water quality sensing value of the sewage in the equalization tank 2 can be kept within the preset range, to prevent the sewage having excessive-high or excessive-low water quality sensing value from converging into the equalization tank 2. As a result, the burden of the preset sewage treatment apparatus 3 for treating sewage can be reduced, and the lifetime of the preset sewage treatment apparatus 3 can be extended.

According to above-mentioned content, the automatic sewage regulation system and the regulating method of the present invention have advantages below.

First, the automatic sewage regulating device 4 can automatically regulate the outflow volumes of the plurality of preset sewage sources 1, to keep the water quality sensing value of the sewage in the equalization tank 2 within the preset range stably, so as to prevent the sewage having excessive-high or excessive-low water quality sensing value from converging into the equalization tank 2, thereby reducing the burden of the preset sewage treatment apparatus 3 for treating sewage and extending the lifetime of the preset sewage treatment apparatus 3. Since the water quality sensing value of the sewage in the equalization tank 2 is kept within the preset range stably, so that the dosage for the purification process of the preset sewage treatment apparatus 3 can be kept in a stable amount, and the sewage treatment cost can be reduced.

Secondly, the plurality of preset sewage sources 1 can automatically regulate the outflow volumes by the automatic sewage regulating device 4, so that the time period in which the sewage having high water quality sensing value flows into the equalization tank 2 can be extended, and the facility utilization time of the preset sewage treatment apparatus 3 can be extended, thereby increasing the facility utilization rate of the preset sewage treatment apparatus 3, and achieving the effect of improving operational efficiency and reducing operational cost.

Thirdly, the plurality of preset sewage sources 1 can automatically regulate the outflow volumes by the automatic sewage regulating device 4, to stably keep the water quality sensing value of the sewage in the equalization tank 2 within the preset range, so that the preset sewage treatment apparatus 3 can use the dosage in a stable amount for purification process, thereby saving manpower for treatment and achieving effect of improving purification, reducing operational cost, and improving convenience in operation.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An automatic sewage regulation system, disposed between a plurality of preset sewage sources and a preset sewage treatment apparatus, and the automatic sewage regulation system comprising:
   an equalization tank connected to preset water outlets of the plurality of preset sewage sources, and configured to converge sewage from the plurality of preset sewage sources and discharge the sewage to the preset sewage treatment apparatus for sewage purification treatment; and
   an automatic sewage regulating device comprising a plurality of sensing modules respectively disposed in the plurality of preset sewage sources, and a control module, and a plurality of water flow regulators, wherein the plurality of sensing modules are configured to sense water quality sensing values of sewage in the plurality of preset sewage sources, and the control module is electrically connected to each of the plurality of sensing modules and configured to receive the water quality sensing values and generate water flow regulation signals, and the plurality of water flow regulators are disposed on the preset water outlets of the plurality of preset sewage sources, respectively, and electrically connected to the control module, and configured to regulate flow volumes of the sewage in the plurality of preset sewage sources flowing into the equalization tank according to the water flow regulation signals transmitted by the control module;

wherein the control module accumulates the water quality sensing values sensed by the plurality of sensing modules to obtain a sum, and compare the sum with a preset water quality sensing threshold set in the equalization tank, and when the sum of the water quality sensing values is higher than the preset water quality sensing threshold of the equalization tank, at least one of the plurality of preset sewage sources having the water quality sensing values higher than the preset water quality sensing threshold is controlled to decrease a water output volume thereof by a corresponding one of the plurality of water flow regulators, and at least one of the plurality of preset sewage sources having the water quality sensing value lower than the preset water quality sensing threshold is controlled to increase or keep the water output volume thereof by the corresponding one of the plurality of water flow regulators, so as to keep the water quality sensing value of the sewage in the equalization tank below the preset water quality sensing threshold, and when the sum of the water quality sensing values sensed by the plurality of sensing modules is lower than the preset water quality sensing threshold of the equalization tank, at least one of the plurality of preset sewage sources having the water quality sensing value higher than the preset water quality sensing threshold is controlled to increase the water output volume thereof by the corresponding one of the plurality of water flow regulators, and at least one of the plurality of preset sewage sources having the water quality sensing value lower than the preset water quality sensing threshold is controlled to decrease or keep the water output volume thereof by the corresponding one of the plurality of water flow regulators, so as to keep the water quality sensing value of the sewage in the equalization tank below the preset water quality sensing threshold, wherein when the sum of the water quality sensing values is higher than the preset water quality sensing threshold of the equalization tank, all of the plurality of preset sewage sources having the water quality sensing values higher than the preset water quality sensing threshold are controlled to decrease the water output volume thereof by all of the plurality of water flow regulators, to keep the water quality sensing value of the sewage in the equalization tank below the preset water quality sensing threshold, and all of the plurality of preset sewage sources are then controlled to increase or keep the water output volume thereof by all of the plurality of water flow regulators, so as to keep the water quality sensing value of the sewage in the equalization tank below the preset water quality sensing threshold, wherein when the sum of the water quality sensing values sensed by the plurality of sensing modules is lower than the preset water quality sensing threshold of the equalization tank, all of the plurality of preset sewage sources having the water quality sensing values lower than the preset water quality sensing threshold are controlled to increase or keep the water output volume thereof by all of the plurality of water flow regulators, to keep the water quality sensing value of the sewage in the equalization tank below the preset water quality sensing threshold, and all of the plurality of preset sewage sources are then controlled to decrease or keep the water output volume thereof by all of the plurality of water flow regulators, to keep the water quality sensing value of the sewage in the equalization tank below the preset water quality sensing threshold, thereby reducing burden of the preset sewage treatment apparatus to extend lifetime of the preset sewage treatment apparatus.

2. The automatic sewage regulation system according to claim 1, wherein the preset sewage treatment apparatus comprises a sewage purification apparatus configured to purify the sewage, which is discharged from the equalization tank, to meet a sewage discharge standard, and the preset sewage treatment apparatus comprises an outfall configured to discharge purified sewage to a preset water area.

3. The automatic sewage regulation system according to claim 2, wherein the sewage purification apparatus comprises a primary sedimentation tank, a sedimentation tank in communication with the primary sedimentation tank, a mixing tank in communication with the sedimentation tank and the primary sedimentation tank, an aeration tank in communication with the sedimentation tank, a secondary sedimentation tank in communication with the aeration tank, a filter tank in communication with the secondary sedimentation tank, and a sewage discharge detection apparatus disposed on the filter tank and configured to detect whether water quality of the sewage in the filter tank meets the sewage discharge standard, and the sewage discharge detection apparatus comprises a discharge pump configured to draw the purified sewage to the outfall.

4. The automatic sewage regulation system according to claim 1, wherein the automatic sewage regulating device further comprises a sensing module disposed in the equalization tank and configured to sense a water quality sensing value of the sewage in the equalization tank.

5. The automatic sewage regulation system according to claim 1, wherein each of the plurality of sensing modules of the automatic sewage regulating device is a temperature sensor, a conductivity sensor, a pH value sensor, a dissolved oxygen sensor, a total dissolved-solid sensor, an oxidation reduction potential sensor, a turbidity sensor, a suspended-solid sensor, a biochemical oxygen demand sensor, a chemical oxygen demand sensor, an ammonia nitrogen sensor, a heavy metal sensor or a flow meter, and each of the plurality of water flow regulators of the automatic sewage regulating device is a pump, an electric flow regulating valve, or a frequency converter.

6. A regulating method applicable an automatic sewage regulation system, comprising:
(A): using a plurality of sensing modules of an automatic sewage regulating device to sense water quality sensing values of sewage in a plurality of preset sewage sources, and transmitting the sensed water quality sensing values to a control module of the automatic sewage regulating device;
(A01): using the control module to accumulates the water quality sensing values sensed by the plurality of sensing modules to obtain a sum, and compare the sum with a preset water quality sensing threshold of an equalization tank, wherein when the sum of the water quality sensing values is higher than the preset water quality sensing threshold of the equalization tank, at least one of the plurality of preset sewage sources having the water quality sensing values higher than the preset water quality sensing threshold are controlled to decrease a water output volume thereof by a corresponding one of a plurality of water flow regulators, and at least one of the plurality of preset sewage sources having the water quality sensing values lower than the preset water quality sensing threshold are controlled to increase or keep the water output volume thereof by the corresponding one of the plurality of water flow regulators, so as to keep the water quality sensing value of the sewage in the equalization tank below the preset water quality sensing threshold, wherein when the sum of the water quality sensing values is lower than the preset water quality sensing threshold of the equalization tank, at least one of the plurality of preset sewage sources having the water quality sensing values higher than the preset water quality sensing threshold are controlled to increase the water output volume thereof by the corresponding one of the plurality of water flow regulators, and at least one of the plurality of preset sewage sources having the water quality sensing values lower than the preset water quality sensing threshold are controlled to decrease or keep the water output volume thereof by the corresponding one of the plurality of water flow regulators, so as to keep the water quality sensing value of the sewage in the equalization tank below the preset water quality sensing threshold, wherein when the sum of the water quality sensing values is higher than the preset water quality sensing threshold of the equalization tank, all of the plurality of preset sewage sources having the water quality sensing values higher than the preset water quality sensing threshold are controlled to decrease the water output volume thereof by all of the plurality of water flow regulators, to keep the water quality sensing value of the sewage in the equalization tank below the preset water quality sensing threshold, and all of the plurality of preset sewage sources are then controlled to increase or keep the water output volume thereof by all of the plurality of water flow regulator, so as to keep the water quality sensing value of the sewage in the equalization tank below the preset water quality sensing threshold, wherein when the sum of the water quality sensing values sensed by the plurality of sensing modules is lower than the preset water quality sensing threshold of the equalization tank, all of the plurality of preset sewage sources having the water quality sensing values lower than the preset water quality sensing threshold are controlled to increase or keep the water output volume thereof by the all of the plurality of water flow regulator, to keep the water quality sensing value of the sewage in the equalization tank below the preset water quality sensing threshold, and all of the plurality of preset sewage sources are then controlled to decrease or keep the water output volume thereof by the all of the plurality of water flow regulators, so as to keep the water quality sensing value of the sewage in the equalization tank below the preset water quality sensing threshold, wherein when the sum of the water quality sensing values is higher than the preset water quality sensing threshold of the equalization tank, a step (B) is performed, and when the sum of the water quality sensing values is lower than the preset water quality sensing threshold of the equalization tank, a step (A02) is performed;

(A02): directly flowing the sewage in the plurality of preset sewage sources into the equalization tank, and performing a step (C);

(B): using the control module to output regulating signals to the plurality of water flow regulators of the automatic sewage regulating device according to the water quality sensing values, to make the plurality of water flow regulators regulate flow volumes of the sewage flowing from the plurality of preset sewage sources to the equalization tank according to the received regulating signals, so as to keep the water quality sensing value of the sewage converging into the equalization tank from the plurality of preset sewage sources below the preset water quality sensing threshold; and (C): flowing the sewage in the equalization tank through a preset sewage treatment apparatus, and using the preset sewage treatment apparatus to perform a purification process to make the sewage flowing through the preset sewage treatment apparatus meet a sewage discharge standard.

7. The regulating method according to claim 6, wherein, in the step (C), the preset sewage treatment apparatus uses a primary sedimentation tank, a sedimentation tank, a mixing tank, an aeration tank, a secondary sedimentation tanks and a filter tank of a sewage purification apparatus to purify sewage, and use a sewage discharge detection apparatus to monitor whether a water quality of the sewage in the filter tank meets the sewage discharge standard, and when the water quality of the filter tank meets the sewage discharge standard, a discharge pump is used to draw the purified sewage to an outfall of the preset sewage treatment apparatus for discharging.

8. The regulating method according to claim 7, wherein the sewage purification apparatus comprises an aeration reflow pipeline disposed on the aeration tank and in communication with an equalization tank, and a driver device disposed on the aeration reflow pipeline and electrically connected to a control module, and when a plurality of sensing modules of an automatic sewage regulating device sense that a sum of a plurality of water quality sensing values is higher than a preset tolerable concentration of the preset sewage treatment apparatus, the control module enables the driver device to reflow aerated water of the aeration tank into the equalization tank via the aeration reflow pipeline, so as to keep the water quality sensing value in the equalization tank within the preset tolerable concentration of the preset sewage treatment apparatus, thereby keeping the water quality sensing values of the sewage converging into the equalization tank from the plurality of preset sewage sources within the preset range, and the automatic sewage regulating device includes the sensing module disposed in the equalization tank, when the sensing module senses that the water quality sensing value in the equalization tank is higher than the preset tolerable concentration of the preset sewage treatment apparatus, the aeration tank of the preset sewage treatment apparatus reflows the aerated water into the equalization tank, so as to reduce the water quality sensing value of the sewage in the equalization tank to below the preset tolerable concentration of the preset sewage treatment apparatus.

\* \* \* \* \*